US 6,555,245 B2

(12) United States Patent
Tajima et al.

(10) Patent No.: US 6,555,245 B2
(45) Date of Patent: Apr. 29, 2003

(54) RESIN COMPOSITION FOR CAPSTOCK

(75) Inventors: Kazuhisa Tajima, Kobe (JP); Riichi Nishimura, League City, TX (US); Takahiko Sugaya, Houston, TX (US)

(73) Assignees: Kaneka Corporation, Osaka (JP); Kaneka Texas Corporation, Pasadena, CA (US)

( * ) Notice: Subject to any disclaimer, the term of this patent is extended or adjusted under 35 U.S.C. 154(b) by 0 days.

(21) Appl. No.: 09/739,629

(22) Filed: Dec. 20, 2000

(65) Prior Publication Data

US 2002/0177658 A1 Nov. 28, 2002

(51) Int. Cl.$^7$ .................. C08L 33/12; C08L 51/04; B32B 27/30
(52) U.S. Cl. ................. 428/520; 525/80; 525/85; 525/308; 525/309
(58) Field of Search .................... 428/520; 525/80, 525/85, 308, 309

(56) References Cited

U.S. PATENT DOCUMENTS

| | | | |
|---|---|---|---|
| 3,793,402 A | * | 2/1974 | Owens |
| 3,843,753 A | * | 10/1974 | Owens |
| 4,198,520 A | | 4/1980 | Samour et al. |
| 4,788,250 A | * | 11/1988 | Kitahara |
| 5,318,737 A | | 6/1994 | Trabert et al. |

FOREIGN PATENT DOCUMENTS

| WO | WO 00/08098 | 2/2000 |
|---|---|---|

* cited by examiner

Primary Examiner—David J. Buttner
(74) Attorney, Agent, or Firm—Armstrong, Westerman & Hattori, LLP

(57) ABSTRACT

An acrylic resin composition suitable for the preparation of capstock for siding panels and having excellent impact resistance, weatherability and processability and a low gloss, which comprises 30 to 100% by weight of an impact modifier having a multilayer structure and 0 to 70% by weight of a methyl methacrylate homopolymer or copolymer and whose MFI (melt flow index measured according to ASTM D-1238 at 230° C. and a load of 3.8 kg) is no more than 0.2 g/10 minutes.

11 Claims, No Drawings

RESIN COMPOSITION FOR CAPSTOCK

BACKGROUND OF THE INVENTION

The present invention relates to a resin composition for capstock containing an impact modifier having a multilayer structure as a main component, and more particularly to a resin composition suitable for producing capstock having excellent impact resistance, weatherability and processability and a low gloss by using a multi-manifold die.

It is well known that acrylic resins are excellent in weatherability. By utilizing this feature, acrylic resins have been used as a capstock for materials which require a weatherability. For example, U.S. Pat. No. 4,198,520 discloses improving the weatherability of materials having a poor weatherability such as ABS resin and PVC by applying an acrylic resin as a capstock to the surface of the materials. Further, U.S. Pat. No. 5,318,737 and WO 00/08098 disclose that an acrylic resin composition suitable for the production of capstock having excellent weatherability and impact resistance is obtained by adding a rubber component to an acrylic resin.

Although these products have been used in the market, however, it is hard to say that they sufficiently meet demands of the market in a field which requires a low gloss, since they have a high gloss peculiar to acrylic resins.

As a method of lowering the gloss are known addition of an inorganic material such as silica or talc, addition of a styrenic block copolymer such as SBS (styrene-butadiene-styrene block copolymer), SB (styrene-butadiene block copolymer), SEBS (styrene-ethylene-butylene-styrene block copolymer) or SIS (styrene-isoprene-styrene), addition of an olefin rubber such as EPR (ethylene-propylene rubber) or EPDM (ethylene-propylene-diene rubber), addition of NBR (nitrile rubber), and the like. However, the addition of these materials is unfavorable because of bringing about lowering of impact resistance or weatherability, although the gloss is reduced thereby.

Also, with respect to the processing method, coextrusion using feed block die is disclosed, for example, in U.S. Pat. No. 5,318,737. Since the viscosity of respective layers must be matched with each other, the melt characteristics of acrylic resin compositions are restricted, and the U.S. patent discloses that MFI must be from 0.4 to 0.75 g/10 minutes. WO 00/08098 does not limit the processing method, but discloses that MFI is not less than 1.5 for obtaining good products. However, if MFI is not less than 0.4, the obtained products have a high gloss and, therefore, are not applicable to uses requiring a low gloss. That is to say, it is required for obtaining low gloss products to increase the viscosity, but resins having an MFI of not more than 0.2 g/10 minutes are not processed to give good products by coextrusion using a feed block die which has been popularly used. Thus, it is difficult to achieve an excellent processability and a low gloss together.

Like this, it is very difficult to stably produce products having a low gloss and a beautiful surface with the impact resistance being maintained. It is the actual situation that there has not been provided a capstock made of an acrylic resin as a main component having impact resistance, weatherability, processability and low gloss that can sufficiently satisfy the demands of the market.

It is an object of the present invention to solve the problems mentioned above and to provide a capstock having excellent impact resistance, weatherability and processability and a low gloss which cannot be achieved by conventional acrylic resins.

A further object of the present invention is to provide an acrylic resin composition having an excellent processability suitable for the production of low gloss capstock.

SUMMARY OF THE INVENTION

The present inventors have found that an acrylic resin composition having an MFI (melt flow index) of not more than 0.2 g/10 minutes and comprising a multilayer structure polymer having a very high viscosity and a very high elasticity, which can serve as an impact modifier, and optionally a methyl methacrylate copolymer has an excellent processability and can provide a capstock having excellent impact resistance and weatherability and a low gloss by coextrusion using a multi-manifold die Thus, the present invention provides:

(1) a resin composition suitable for extrusion to prepare a capstock using a multi-manifold die comprising 100 to 30 parts by weight of an impact modifier having a multilayer structure and 0 to 70 parts by weight of a methyl methacrylate polymer comprising 50 to 100% by weight of methyl methacrylate and 50 to 0% by weight of a copolymerizable monomer, the total of said impact modifier and said methyl methacrylate polymer being 100 parts by weight and said composition having an MFI (melt flow index measured according to ASTM D-1238 at 230° C. and a load of 3.8 kg) of not more than 0.2 g/10 minutes;

(2) the composition of item (1), which comprises 20 to 60 parts by weight of said methyl methacrylate polymer and 80 to 40 parts by weight of said impact modifier, the total thereof being 100 parts by weight;

(3) the composition of item (1), wherein said methyl methacrylate polymer comprises 5 to 90% by weight of a methyl methacrylate polymer having a molecular weight of not less than 500,000 and 95 to 10% by weight of a methyl methacrylate polymer having a molecular weight of less than 500,000;

(4) the composition of item (1), wherein said impact modifier is a polymer having two layer structure prepared by polymerizing 50 to 15 parts by weight of a monomer mixture comprising 50 to 100% by weight of a (meth)acrylic ester and 50 to 0% by weight of a copolymerizable monomer in the presence of 50 to 85 parts by weight of a crosslinked acrylic rubber;

(5) the composition of item (1), wherein said impact modifier is a polymer having three layer structure prepared by polymerizing 30 to 60 parts by weight of a monomer mixture comprising 50 to 99.9% by weight of an alkyl acrylate, 50 to 0% by weight of a copolymerizable monomer and 0.1 to 5% by weight of a crosslinking monomer in the presence of 10 to 40 parts by weight of a polymer prepared by polymerization of 80 to 99.9% by weight of methyl methacrylate, 20 to 0% by weight of a copolymerizable monomer and 0.1 to 5% by weight of a crosslinking monomer to give a two-layered polymer, and then polymerizing 10 to 60 parts by weight of a monomer mixture comprising 50 to 100% by weight of a (meth)acrylic ester and 50 to 0% by weight of a copolymerizable monomer in the presence of said two-layered polymer;

(6) the composition of item (1), wherein said capstock is a capstock for a siding panel made of polyvinyl chloride; and (7) a siding panel obtained by extrusion using the composition of item (1) as a capstock and a vinyl chloride resin as a substrate.

DETAILED DESCRIPTION

The acrylic resin composition of the present invention comprises 0 to 70 parts (parts by weight, hereinafter the same) of a methyl methacrylate polymer comprising 50 to 100% (% by weight, hereinafter the same) of methyl methacrylate and 50 to 0% of a copolymerizable monomer and 100 to 30 parts of an impact modifier having a multilayer structure (the total being 100 parts), and the composition has an MFI (melt flow index measured according to ASTM D-1238 at 230° C. and a load of 3.8 kg) of not more than 0.2 g/10 minutes. The acrylic resin composition is suitable for the production of capstocks by extrusion using a multi-manifold die.

The methyl methacrylate polymer includes homopolymer and copolymers obtained by polymerization of 50 to 100% of methyl methacrylate and 50 to 0% of a monomer copolymerizable therewith. If the amount of methyl methacrylate is less than 50%, the effect of improving the weatherability of capstock moldings is insufficient. The content of methyl methacrylate is preferably from 60 to 98%, more preferably from 75 to 95%. The monomers copolymerizable with methyl methacrylate include, for instance, aromatic vinyl compounds, acrylic esters, alkyl methacrylates other than methyl methacrylate, and the like.

Examples of the aromatic vinyl compounds are, for instance, styrene, α-methylstyrene, chlorostyrene and other styrene derivatives.

Examples of the acrylic esters are, for instance, ethyl acrylate, butyl acrylate, n-octyl acrylate, 2-ethylhexyl acrylate and other alkyl acrylates.

These monomers may be used alone or in admixture thereof.

The methyl methacrylate polymer can be prepared by emulsion polymerization, suspension polymerization, bulk polymerization, solution polymerization and so on. Of these, bulk polymerization is particularly preferred from the viewpoint of decreasing the content of impurity in the polymer.

The impact modifier having a multilayer structure is a polymer having a multilayer structure obtained by polymerizing a vinyl monomer in a single stage or in two or more stages in the presence of particles of a rubbery polymer. The rubbery polymer includes, for instance, an acrylic rubber, a diene rubber, a silicone rubber and the like. Examples of the diene rubber are, for instance, polybutadiene rubber, isoprene rubber, SBR, NBR, and the like. Examples of the acrylic rubber are, for instance, butyl acrylate-based rubber, n-octyl acrylate-based rubber, 2-ethylhexyl acrylate-based rubber, and the like. Of these, acrylic rubbers are preferred from the viewpoint that the weatherability of obtained capstocks is not lowered. In general, these rubbers are used in the form of crosslinked rubber. Known crosslinking monomers are used as a compound for forming a crosslinked structure. Preferable examples of the crosslinking monomer are allyl methacrylate, allyl acrylate, diallyl maleate, diallyl fumarate, diallyl itaconate, monoallyl maleate, butadiene, divinyl benzene, and the like. These may be used alone or in admixture thereof.

The crosslinked rubber particles may further contain a hard polymer in the inner layer as a core of the particle.

The crosslinked acrylic rubbers are obtained, for example, by polymerizing a monomer mixture of 50 to 99.9% of an alkyl acrylate having a $C_4$ to $C_8$ alkyl group, 50 to 0% of a copolymerizable monomer and 0.1 to 5% of a crosslinking monomer. Examples of the monomer copolymerizable with the alkyl acrylate are, for instance, alkyl acrylates having a $C_1$ to $C_3$ alkyl group, aromatic vinyl compounds such as styrene, α-methylstyrene, chlorostyrene and other styrene derivatives, alkyl methacrylates such as methyl methacrylate and ethyl methacrylate, vinyl cyanide compounds such as acrylonitrile, vinyl acetate, and other vinyl compounds. These monomers may be used alone or in admixture thereof. In case of forming a hard core as an inner layer of the crosslinked acrylic rubber, the above-mentioned monomer mixture is polymerized preferably in the presence of a hard polymer obtained by a polymerization, preferably emulsion polymerization, of a monomer mixture of 80 to 99.9% of methyl methacrylate, 0 to 50% of a copolymerizable monomer and 0.1 to 5% of a crosslinking monomer. Examples of the copolymerizable monomer used in the preparation of the hard polymer are alkyl (meth)acrylates other than methyl methacrylate, aromatic vinyl compounds such as styrene and other styrene derivatives, vinyl cyanide compounds and other vinyl compounds. These monomers may be used alone or in admixture thereof.

In general, the impact modifier having a multilayer structure is obtained by polymerizing 10 to 70% of a vinyl monomer in a single stage or in two or more stages in the presence of 90 to 30% of crosslinked rubber particles. The content of the crosslinked rubber particles in the obtained multi-layered polymer is preferably from 50 to 85%, more preferably from 60 to 80%, from the viewpoints of moldability and weatherability.

Examples of the vinyl monomer to be polymerized in the presence of the rubber polymer particles are, for instance, an alkyl methacrylate such as methyl methacrylate or ethyl methacrylate, an alkyl acrylate, e.g., an alkyl acrylate having a $C_1$ to $C_8$ alkyl group such as methyl acrylate, ethyl acrylate or butyl acrylate, an aromatic vinyl compound such as styrene, α-methylstyrene, chlorostyrene, other styrene derivatives or vinyl toluene, a vinyl cyanide compound such as acrylonitrile or methacrylonitrile, a halogen-containing vinyl compound such as vinyl chloride, vinyl acetate, and the like. The polymerization for the multi-layered polymer is conducted by emulsion polymerization, suspension polymerization, bulk polymerization, solution polymerization and the like. Emulsion polymerization method is preferred from the viewpoint that control of polymer structure is easy.

As an impact modifier having a multilayer structure are preferably used a two-layered polymer obtained by polymerizing 50 to 15 parts of a graft monomer mixture of 50 to 100% of a (meth)acrylic ester and 50 to 0% of a copolymerizable monomer in the presence of 50 to 85 parts of a crosslinked acrylic rubber (the total of the rubber and the monomer mixture being 100 parts); and a three-layered polymer obtained by polymerizing 10 to 60 parts of a graft monomer mixture of 50 to 100% of a (meth)acrylic ester and 50 to 0% of a copolymerizable monomer in the presence of a crosslinked acrylic rubber having a two layer structure obtained by polymerizing 30 to 60 parts of a monomer mixture of 50 to 99.9% of an alkyl acrylate having a $C_4$ to $C_8$ alkyl group, 50 to 0% of a copolymerizable monomer and 0.1 to 5% of a crosslinking monomer in the presence of 10 to 40 parts of a hard polymer which forms a hard core (the total of the core layer, the rubber layer and the graft layer being 100 parts). As the copolymerizable monomer in the graft monomer mixture are used vinyl monomers as mentioned above copolymerizable with the (meth)acrylic esters.

The methyl methacrylate polymer mentioned above is preferably a combination of at least two polymers having a different molecular weight. That is to say, there is suitably used a mixture of preferably 10 to 95%, more preferably 30 to 80%, of a methyl methacrylate polymer having a molecular weight of less than 500,000 and preferably 5 to 90%, more preferably 20 to 70%, of a methyl methacrylate polymer having a molecular weight of not less than 500,000. The molecular weight as used herein means a weight average molecular weight measured by GPC and calculated based on polystyrene having known molecular weights. The gloss lowering mechanisms by the methyl methacrylate polymer having a molecular weight of not less than 500,000 are assumed that one is to provide a resin with viscosity and elasticity and the other is to make a surface rough since it does not completely disperse into a methyl methacrylate polymer composed mainly of methyl methacrylate having a molecular weight of less than 500,000 and, as a result, is present in a size of several micrometers.

The resin composition of the present invention for extrusion into capstock comprises 0 to 70 parts, preferably 20 to 60 parts, of the above-mentioned methyl methacrylate polymer and 100 to 30 parts, preferably 80 to 40 parts, of the above-mentioned impact modifier having a multilayer structure. The composition comprising 20 to 60 parts of the methyl methacrylate polymer and 80 to 40 parts of the impact modifier having a multilayer structure is preferable from the viewpoint of a balance between the impact resistance and the processability. The resin composition of the present invention is characterized by its fluidity, and it is important that the composition has an MFI (melt flow index) of not more than 0.2 g/10 minutes measured according to ASTM D-1238 at 230° C. and a load of 3.8 kg. The MFI of the composition is preferably from 0.01 to 0.15 g/10 minutes, more preferably from 0.03 to 0.1 g/10 minutes.

The process for preparing the acrylic resin composition of the present invention is not particularly limited, and the composition is obtained by mixing the methyl methacrylate polymer and the multi-layered impact modifier in a usual manner. The methyl methacrylate polymer and the multi-layered impact modifier may be prepared together by carrying out a graft polymerization to form a free polymer corresponding to the methyl methacrylate polymer.

The composition of the present invention may contain usual additives such as antioxidant, light stabilizer, lubricant, pigment and the like, as occasion demands.

Siding panels having excellent weatherability, impact resistance and processability and a low gloss can be obtained by using the acrylic resin composition of the present invention as a capstock.

Various thermoplastic resins such as vinyl chloride resins and ABS resins are used as a resin of the substrate for the capstock. Vinyl chloride resins are particularly preferred from the viewpoints of processability and weatherability.

The present invention is more specifically explained by means of the following Examples and Comparative Example. It is to be understood that the present invention is not limited to these Examples.

EXAMPLE 1

Preparation of Impact Modifier having Three Layer Structure (a) Polymerization for Innermost Layer A glass reactor was charged with a mixture having the following composition. After elevating the temperature to 80° C. with stirring in a nitrogen stream, 25% of a liquid mixture of innermost layer components comprising 25 parts of methyl methacrylate, 0.1 part of allyl methacrylate and 0.1 part of t-butyl hydroperoxide was added all at once to the reactor, and the polymerization was carried out for 45 minutes.

| Mixture | part |
| --- | --- |
| Deionized water | 220 |
| Boric acid | 0.3 |
| Sodium carbonate | 0.03 |
| N-Lauroylsarcosine sodium salt | 0.09 |
| Formaldehyde sodium sulfoxylate | 0.09 |
| Disodium ethylenediaminetetraacetate | 0.006 |
| Ferrous sulfate hepahydrate | 0.002 |

Subsequently, the remaining 75% of the mixture was continuously added to the reactor over 1 hour. After the completion of the addition, the reaction system was kept at 80° C. for 2 hours to complete the polymerization. During this period, 0.2 part of N-lauroylsarcosine sodium salt was added. The polymer particles in the obtained latex of an innermost layer crosslinked methacrylic polymer had an average particle size of 1,600 Å (measured using light scattering at a wavelength of 546 nm). The polyemrization conversion [(amount of polymer produced/amount of monomer charged)×100] was 98%.

(b) Polymerization for Rubbery Polymer

After adding 0.1 part of potassium persulfate to the crosslinked methacrylic polymer latex obtained in (a) which was kept at 80° C. in a nitrogen stream, a monomer mixture of 41 parts of n-butyl acrylate, 9 parts of styrene and 1 part of allyl methacrylate was continuously added to the latex over 5 hours. During this period, potassium oleate was added three times in an amount of 0.1 part in total. After the completion of the addition of the monomer mixture, 0.05 part of potassium persulfate was further added and the reaction system was kept for 2 hours to complete the polymerization. The obtained polymer had an average particle size of 2,300 Å, and the polymerization conversion was 99%.

(c) Polymerization for Outermost Layer

The rubbery polymer latex obtained in (b) was kept at 80° C. After adding 0.02 part of potassium persulfate thereto, a monomer mixture of 24 parts of methyl methacrylate, 1 part of n-butyl acrylate and 0.1 part of t-dodecylmercaptan was continuously added to the latex over 1 hour. After the completion of the addition of the monomer mixture, the reaction system was further kept for 1 hour to give a latex of a multilayer graft copolymer. The multilayer graft copolymer had an average particle size of 2,530 Å, and the polymerization conversion was 99%. The obtained multilayer graft copolymer latex was subjected to salting out for coagulation, heat treatment and drying in a known manner to give a white powder of the multilayer graft copolymer.

Preparation of Resin Composition

To 70 parts of the obtained impact modifier and 30 parts of a methyl methacrylate copolymer composed of methyl methacrylate as a main component (methacrylic resin "Acrylite M-30" made by CYRO Corp. having a molecular weight of 70,000) were added, based on 100 parts of the total of the impact modifier and the copolymer, 5 parts of titanium oxide and 1 part of a ultraviolet absorber (Tinuvin-P made by Ciba Specialty Chemicals K.K. Japan). The resulting mixture was kneaded and pelletized using a twin screw extruder.

Preparation of Siding Sheet

For the preparation of a substrate was used a composition comprising 100 parts of polyvinyl chloride (S-1001 made by Kaneka Corporation), 1 part of a stabilizer (MARK-1900 made by WITCO Corporation), 1 part of calcium stearate, 1 part of paraffin wax, 1 part of titanium oxide, 10 parts of calcium carbonate and 10 parts of an impact modifier (FM-31 made by Kaneka Corporation). An extruder KMD-130 made by Kraus Maffai was used for the extrusion of the substrate, an extruder KMD-60 made by Kraus Maffai was used for the extrusion of a capstock, and a laminate sheet was obtained by using a dual manifold die. The thickness of the substrate was adjusted to 0.8 mm, and the thickness of the capstock was adjusted to 0.2 mm.

Using the obtained sample, a Gardner impact strength (G.I., unit: inch·lb/mil) was measured at 23° C. according to ASTM D4226-93. The gloss at 75° was also measured. The results are shown in Table 1.

EXAMPLE 2

Preparation of Impact Modifier having Two Layer Structure (a) Preparation of Rubbery Polymer A glass reactor was charged with a mixture having the following composition. After elevating the temperature to 50° C. with stirring in a nitrogen stream, a monomer mixture comprising 100 parts of n-butyl acrylate, 1 part of allyl methacrylate and 0.1 part of cumene hydroperoxide was added dropwise to the reactor over 4 hours. Simultaneously with the addition of the monomer mixture, 2 parts of a 5% aqueous solution of potassium stearate was continuously added over 4 hours. After the completion of the addition, the reaction system was further stirred for 5 hours to complete the polymerization. The polymerization conversion was 97%, and the average particle size of the obtained polymer was 700 Å.

| Mixture | part |
|---|---|
| Deionized water | 250 |
| Potassium stearate | 0.5 |
| Formaldehyde sodium sulfoxylate | 0.2 |
| Disodium ethylenediaminetetraacetate | 0.01 |
| Ferrous sulfate hepahydrate | 0.005 |

(b) Preparation of Outer Layer

A glass reactor was charged with 75 parts of the crosslinked rubber polymer latex obtained in (a), 0.05 part of formaldehyde sodium sulfoxylate, 0.01 part of disodium ethylenediaminetetraacetate and 0.005 part of ferrous sulfate heptahydrate. The aqueous dispersion was stirred in a nitrogen stream at 50° C. To the reactor were then continuously added over 1 hour 20 parts of methyl methacrylate and 5 parts of butyl methacrylate as graft monomer components and 0.05 part of cumene hydroperoxide as a polymerization initiator. After the completion of the addition, 0.01 part of cumene hydroperoxide was added and the reaction system was further stirred for 2 hours to complete the polymerization. The polymerization conversion was 99.8%. The powdery polymer was obtained from the resulting latex according to the procedure in the preparation of impact modifier in Example 1.

Preparation of Resin Composition

To 70 parts of the obtained impact modifier and 30 parts of a methyl methacrylate copolymer composed of methyl methacrylate as a main component (Acrylite M-30) were added, based on 100 parts of the total of the impact modifier and the copolymer, 5 parts of titanium oxide and 1 part of a ultraviolet absorber (Tinuvin-P). The resulting mixture was kneaded and pelletized using a twin screw extruder.

Preparation of Siding Sheet

A laminate sheet was prepared in the same manner as in Example 1. The results of evaluation of the physical properties of this siding laminate sheet are shown in Table 1.

EXAMPLE 3

Preparation of Methyl Methacrylate Copolymer Having a Molecular Weight of not Less than 500,000

A reactor equipped with a stirrer was charged with 200 parts of water, 1 part of sodium dioctylsuccinate and 0.2 part of potassium persulfate. After purging oxygen in water and the space of the reactor by passing nitrogen, the content was heated to 65° C. with stirring. To the reactor was then added over 4 hours a monomer mixture of 60 parts of methyl methacryflate, 15 parts of n-butyl methacrylate and 15 parts of n-butyl acrylate, and was further stirred with heating for 1 hour to complete the polymerization. A monomer mixture of 5 parts of n-butyl methacrylate and 5 parts of n-butyl acrylate was then added over 1 hour, and the content was kept at 65° C. for 1.5 hours and cooled. The polymerization conversion was 99.2%. The obtained polymer had an average particle size of 650 Å. The obtained copolymer latex was subjected to salting out for coagulation, heat treatment and drying in a known manner to give a white powder of the copolymer. The molecular weight of this copolymer was 1,200,000.

By using a resin composition comprising 35 parts of the impact modifier obtained in Example 1, 30 parts of the impact modifier obtained in Example 2, 10 parts of the above methyl methacrylate copolymer which had a molecular weight of not less than 500,000, and 25 parts of a methyl methacrylate copolymer having a molecular weight of 70,000 (Acrylite M-30), a siding sheet was prepared by conducting the extrusion in the same manner and the physical properties thereof were evaluated. The results are shown in Table 1.

EXAMPLE 4

By using a resin composition comprising 30 parts of the impact modifier obtained in Example 1, 30 parts of the impact modifier obtained in Example 2, 15 parts of the methyl methacrylate copolymer obtained in Example 3 which had a molecular weight of not less than 500,000, and 25 parts of a methyl methacrylate copolymer having a molecular weight of 70,000 (Acrylite M-30), a siding sheet was prepared by conducting the extrusion in the same manner and the physical properties thereof were evaluated. The results are shown in Table 1.

COMPARATIVE EXAMPLE 1

A siding sheet was prepared in the same manner by using 45 parts of the impact modifier obtained in Example 2 and 55 parts of a methyl methacrylate copolymer having a molecular weight of 70,000 (Acrylite M-30) without using a methyl methacrylate copolymer having a molecular weight of not less than 500,000. MFI was 1.9. The results of evaluation are shown in Table 1.

TABLE 1

|       | Ex. 1 | Ex. 2 | Ex. 3 | Ex. 4 | Com. Ex. 1 |
|-------|-------|-------|-------|-------|------------|
| MFI   | 0.09  | 0.03  | 0.05  | 0.03  | 1.9        |
| Gloss | 49    | 47    | 27    | 19    | 73         |
| G.I.  | 55    | 86    | 75    | 68    | 45         |

What we claim is:

1. A resin composition suitable for extrusion to prepare a capstock using a multi-manifold die comprising 80 to 30 parts by weight of an impact modifier having a multilayer structure and 20 to 70 parts by weight of a methyl methacrylate polymer comprising 50 to 100% by weight of methyl methacrylate and 50 to 0% by weight of a copolymerizable monomer, the total of said impact modifier and said methyl methacrylate polymer being 100 parts by weight and said composition having an MFI (melt flow index measured according to ASTM D-1238 at 230° C. and a load of 3.8 kg) of not more than 0.2 g/10 minutes, wherein said methyl methacrylate polymer comprises 5 to 90% by weight of a methyl methacrylate polymer having a molecular weight of not less than 500,000 and 95 to 10% by weight of a methyl methacrylate polymer having a molecular weight of less than 500,000.

2. The composition of claim 1, which comprises 80 to 40 parts by weight of said impact modifier (a) and 20 to 60 parts by weight of said methyl methacrylate polymer (b), the total of (a) and (b) being 100 parts by weight.

3. The composition of claim 1, wherein said capstock is a capstock for a siding panel made of polyvinyl chloride.

4. The composition of claim 1, wherein said impact modifier is a polymer having two layer structure prepared by polymerizing 80 to 15 parts by weight of a monomer mixture comprising 50 to 100% by weight of a (meth)acrylic ester and 50 to 0% by weight of a copolymerizable monomer in the presence of 20 to 85 parts by weight of a crosslinked acrylic rubber.

5. The composition of claim 1, wherein said impact modifier is a polymer having three layer structure prepared by polymerizing 30 to 60 parts by weight of a monomer mixture comprising 50 to 99.5% by weight of a copolymerizable monomer and 0.1 to 5% by weight of a crosslinking monomer in the presence of 10 to 40 parts by weight of a polymer prepared by polymerization of 80 to 99.5% by weight of methyl methacrylate, 20 to 0% by weight of a copolymerizable monomer and 0.1 to 5% by weight of a crosslinking monomer to give a two-layered polymer, and then polymerizing 10 to 60 parts by weight of a monomer mixture comprising 50 to 100% by weight of a (meth)acrylic ester and 50 to 0% by weight of a copolymerizable monomer in the presence of said two-layered polymer.

6. A siding panel obtained by extrusion of a capstock and a substrate, wherein said capstock is comprised of a resin composition using a multi-manifold die comprising 100 to 30 parts by weight of an impact modifier having a multilayer structure and 0 to 70 parts by weight of a methyl methacrylate polymer comprising 50 to 100% by weight of methyl methacrylate and 50 to 0% by weight of a copolymerizable monomer, the total of said impact modifier and said methyl methacrylate polymer being 100 parts by weight and said composition having an MFI (melt flow index measured according to ASTM D-1238 at 230° C. and a load of 3.8 kg) of not more than 0.2 g/10 minutes, and wherein said substrate is vinyl chloride resin.

7. The siding panel of claim 6, which said capstock comprises 80 to 40 parts by weight of said impact modifier (a) and 20 to 60 parts by weight of said methyl methacrylate polymer (b), the total of (a) and (b) being 100 parts by weight.

8. The siding panel of claim 6, wherein said methyl methacrylate polymer comprises 5 to 90% by weight of a methyl methacrylate polymer having a molecular weight of not less than 500,000 and 95 to 10% by weight of a methyl methacrylate polymer having a molecular weight of less than 500,000.

9. The siding panel of claim 6, wherein said impact modifier is a polymer having two layer structure prepared by polymerizing 80 to 15 parts by weight of a monomer mixture comprising 50 to 100% by weight of a (meth)acrylic ester and 50 to 0% by weight of a copolymerizable monomer in the presence of 20 to 85 parts by weight of a crosslinked acrylic rubber.

10. The siding panel of claim 6, wherein said impact modifier is a polymer having three layer structure prepared by polymerizing 30 to 60 parts by weight of a monomer mixture comprising 50 to 99.5% by weight of a copolymerizable monomer and 0.1 to 5% by weight of a crosslinking monomer in the presence of 10 to 40 parts by weight of a polymer prepared by polymerization of 80 to 99.5% by weight of methyl methacrylate, 20 to 0% by weight of a copolymerizable monomer and 0.1 to 5% by weight of a crosslinking monomer to give a two-layered polymer, and then polymerizing 10 to 60 parts by weight of a monomer mixture comprising 50 to 100% by weight of a (meth)acrylic ester and 50 to 0% by weight of a copolymerizable monomer in the presence of said two-layered polymer.

11. The siding panel of claim 6, wherein said capstock is a capstock for a siding panel made of polyvinyl chloride.

* * * * *